US008228395B2

(12) United States Patent
Chitnis et al.

(10) Patent No.: US 8,228,395 B2
(45) Date of Patent: Jul. 24, 2012

(54) PROCESSING IMAGE FRAMES IN DIFFERENT FORMATS WITH REDUCED MEMORY REQUIREMENTS IN DIGITAL STILL CAMERAS

(75) Inventors: Kedar Satish Chitnis, Bangalore (IN); Jacob Jose, Kottayam(dt) (IN)

(73) Assignee: Texas Instruments Incorporated, Dallas, TX (US)

( * ) Notice: Subject to any disclaimer, the term of this patent is extended or adjusted under 35 U.S.C. 154(b) by 438 days.

(21) Appl. No.: 12/542,693

(22) Filed: Aug. 17, 2009

(65) Prior Publication Data

US 2010/0165151 A1    Jul. 1, 2010

(51) Int. Cl.
*H04N 5/228* (2006.01)
(52) U.S. Cl. .................. 348/222.1; 348/231.99
(58) Field of Classification Search .............. 348/207.2, 348/231.99, 222.1; 382/254
See application file for complete search history.

(56) References Cited

U.S. PATENT DOCUMENTS

| 6,806,978 | B1 * | 10/2004 | Tamura et al. | 358/1.15 |
| 7,256,823 | B2 * | 8/2007 | Ward et al. | 348/231.3 |
| 2009/0154833 | A1 * | 6/2009 | Sakaue et al. | 382/282 |

* cited by examiner

*Primary Examiner* — Tuan Ho
(74) *Attorney, Agent, or Firm* — Mirna Abyad; Wade J. Brady, III; Frederick J. Telecky, Jr.

(57) ABSTRACT

In a digital still camera, pixel values representing an image frame in a first format are stored in a memory. The pixel values of the image frame in the first format are converted to a second format. The pixel values in the second format are stored in the memory by overwriting at least a portion of the pixel values in the first format. Memory space is thus conserved by the overwriting, thereby requiring reduced memory for storage of pixel values in the digital still camera. The minimum delay (shot to shot interval) required between user-indicated image capture instances is also reduced.

17 Claims, 5 Drawing Sheets

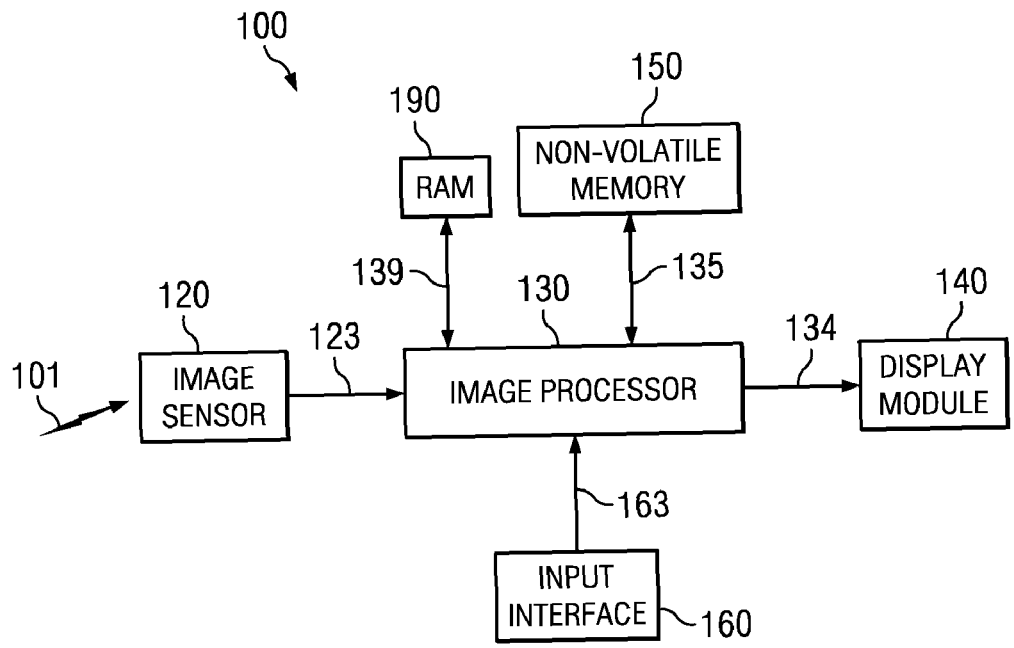
FIG. 1
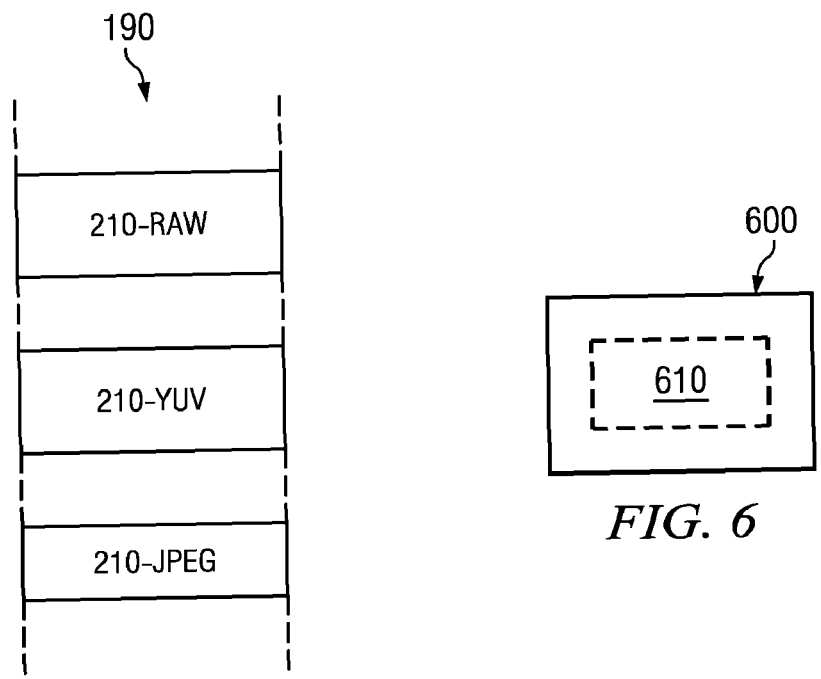
FIG. 2A
FIG. 6

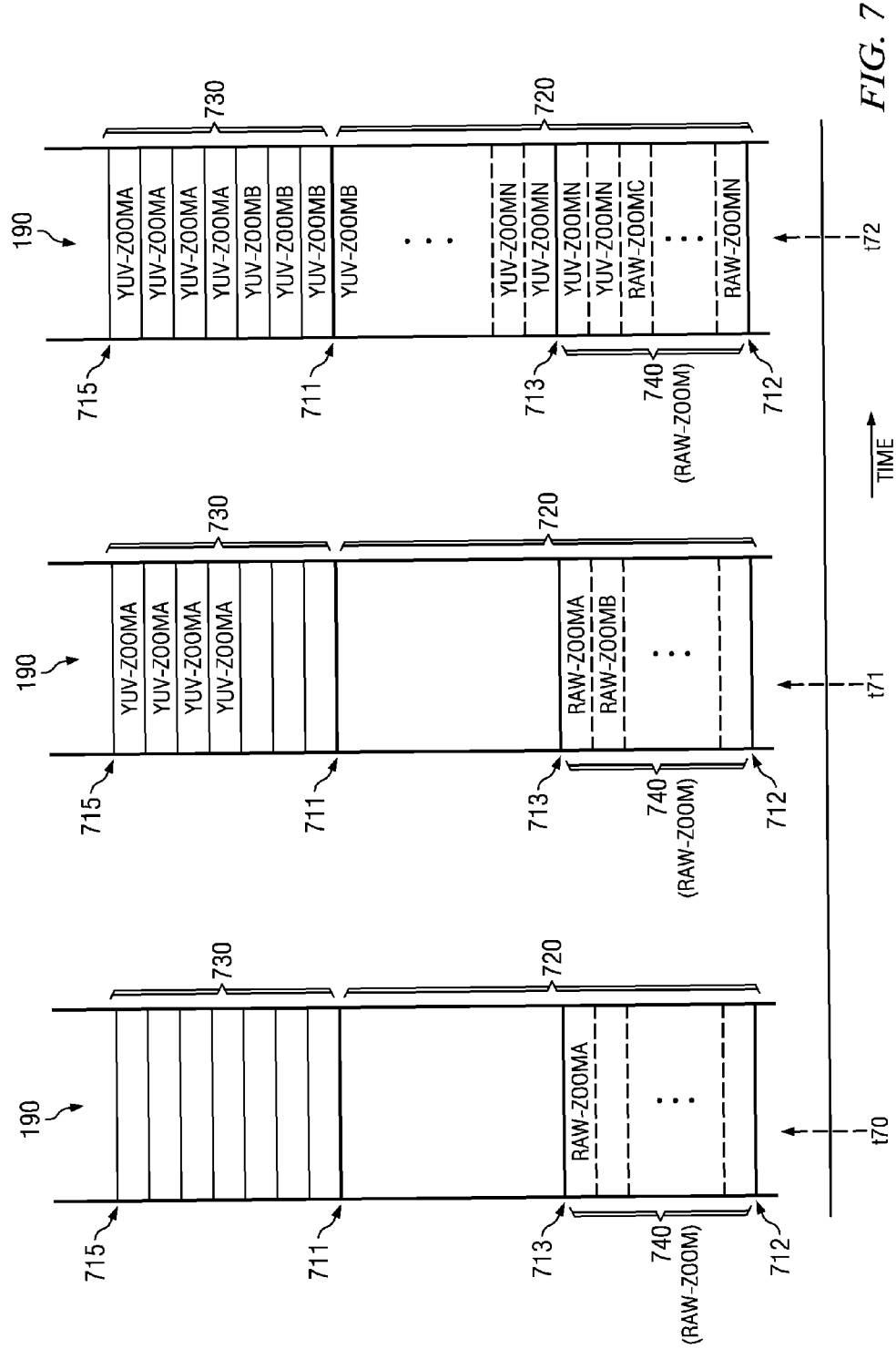

PROCESSING IMAGE FRAMES IN DIFFERENT FORMATS WITH REDUCED MEMORY REQUIREMENTS IN DIGITAL STILL CAMERAS

RELATED APPLICATION(S)

The present application claims the benefit of co-pending India provisional application serial number: 3285/CHE/2008, entitled: "Techniques to improve response time and minimize memory requirements in a digital camera", filed on Dec. 26, 2008, naming Texas Instruments Inc. (the intended assignee) as the Applicant, and naming the same inventors as in the present application as inventors, and is incorporated in its entirety herewith.

BACKGROUND OF THE INVENTION

1. Technical Field

Embodiments of the present disclosure relate generally to digital still cameras, and more specifically to a digital still camera processing image frames in different formats with reduced memory requirements.

2. Related Art

Digital still cameras refer to image capture devices, which capture an image of objects in a scene upon a user action (typically referred to as clicking). Each image (thus captured or thereafter processed) is represented by digital data, and accordingly the camera is referred to as a 'digital' camera, and the digital data together representing a captured scene/image is referred to as an image frame. The camera is referred to as a still camera since typically a single image of a scene is captured in response to a single user action.

Digital still cameras may represent the same image frame in several formats, for example, to simplify processing. As an illustration, an image frame may be generated first in Bayer (raw) format, and several image processing operations such as auto-white balance, color filter array (CFA) interpolation, color processing, etc., may be performed on the raw image frame. The raw image frame may be converted to another format (e.g., YUV format) for image processing operations such as edge enhancement, brightness and contrast adjustments, noise filtering, efficient compression to JPEG (Joint Photographic Experts Group) format, etc. The image in the form of YUV pixel values may then be compressed (e.g., into JPEG format) for space-efficient storage and/or transmission.

There is often a need to reduce memory requirements in digital still cameras, particularly when the available memory space is limited (such as in low cost digital still cameras).

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An aspect of the present invention reduces memory space requirements in digital still cameras, when pixel values representing an image frame in a first format are stored in a memory and converted to a second format. The pixel values in the second format are stored in the memory by overwriting at least a portion of the pixel values in the first format. Memory space is thus conserved by the overwriting, thereby requiring reduced memory for storage of pixel values in the digital still camera.

The reduced memory requirements may also lead to avoidance of memory bottlenecks in such conversion, thereby providing the benefit of the reducing the delay (shot to shot interval) required between user-indicated image capture instances, in some embodiments.

Such a feature is supported in the context of digital zoom in an embodiment. The pixel values of a portion of the captured image frame may be converted (e.g., to YUV format) and replicated to provide a magnified image. The pixel values representing the magnified image are stored to overwrite at least some of the (raw) pixel values of the portion of the captured image.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF THE VIEWS OF DRAWINGS

Example embodiments of the present invention will be described with reference to the accompanying drawings briefly described below.

FIG. 1 is a block diagram of an example device/system in which several aspects of the present invention can be implemented.

FIG. 2A is a diagram illustrating the manner in which data representing different formats of a same image frame are stored in a memory according to a prior approach.

Figure 5:
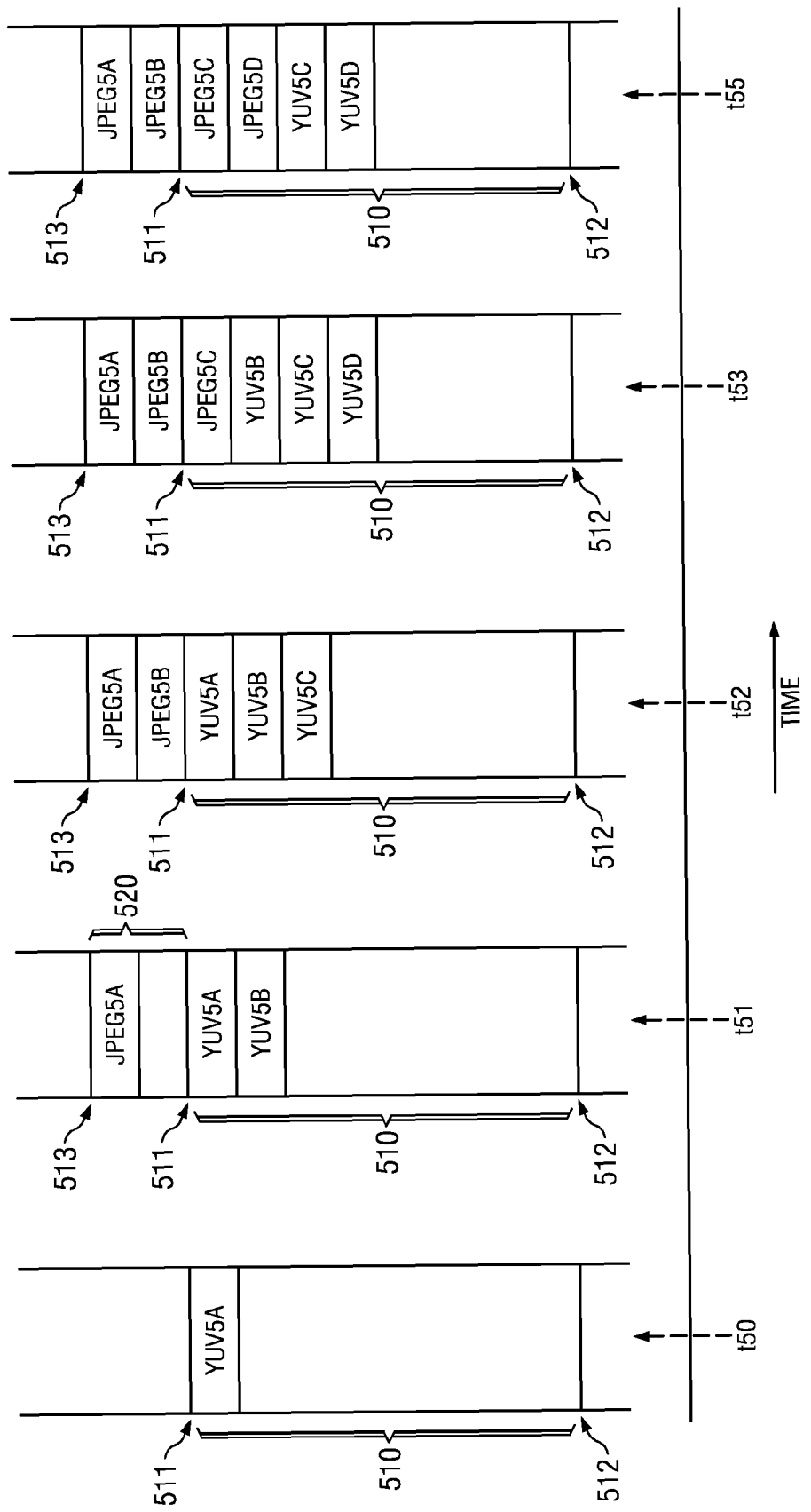

FIG. 5 a diagram illustrating example contents of a memory at different instances of time, in an alternative embodiment of the present invention.

FIG. 6 is a diagram of an image frame and a portion within the image frame used for digital zoom, in an embodiment of the present invention.

FIG. 7 is a diagram illustrating example contents of a memory at different instance of time when a digital zoom operation is performed, in an embodiment of the present invention.

The drawing in which an element first appears is indicated by the leftmost digit(s) in the corresponding reference number.

DETAILED DESCRIPTION

Various embodiments are described below with several examples for illustration.

1. Example System/Device

FIG. 1 is a block diagram illustrating an example device in which several features of the present invention may be implemented. The example device is shown containing only representative systems for illustration. However, real-world environments may contain many more systems/components as will be apparent to one skilled in the relevant arts. Implementations in such systems/components are also contemplated to be within the scope and spirit of various aspects of the present invention. Digital still camera 100 (camera 100) is shown containing image sensor 120, image processor 130, display module 140, non-volatile memory 150, input (I/P) interface 160, and RAM 190.

Image sensor 120 may contain an array of sensors, which together generate digital data (pixel values, for example, in Bayer format) representing an image 101. Image sensor 120 forwards the pixel values to image processor 130 on path 123, and may be implemented as a charge coupled device (CCD) sensor, CMOS sensor, or according to other sensor technologies.

Display module 140 contains a display screen and any needed hardware/software support, and operates to display an image frame received from image processor 130 on path 134. Display module 140 may also receive various control signals (not shown) from image processor 130 indicating, for example, which image frame is to be displayed, the pixel resolution to be used, etc. Display module 140 may also contain memory internally for temporary storage of pixel values for image refresh purposes, and is implemented in an embodiment to include an LCD display. Input interface 160 provides a user with the facility to provide inputs (on path 163), for example, to 'click' to capture an image, to select digital "zoom" features, etc.

Non-volatile memory 150 stores image frames received from image processor 130 via path 135. The image frames may be retrieved from non-volatile memory 150 by image processor 130 and provided to display module 140 for display. In an embodiment, a portion of non-volatile memory 150 is implemented as a secure digital (SD) card memory module. Non-volatile memory 150 may be implemented as a removable plug-in card, thus allowing a user to move the captured images to another system for viewing or processing, or to use other instances of plug-in cards.

Non-volatile memory 150 may be implemented as a solid state memory, and may contain additional memory units (e.g. ROM, EEPROM, flash memory, etc.) to store instructions, which when executed by image processor 130 provide various features of the invention described herein. In general, such a memory unit (including RAMs, non-volatile memory, whether removable or not) from which instructions can be retrieved and executed are referred to as a computer (or machine) readable medium. It should be appreciated that the computer readable medium can be deployed in various other embodiments, potentially in devices, which are not intended for capturing images, but providing several features described herein.

Image processor 130 receives image frames in the form of pixel values on path 123, and may perform various processing operations on the pixel values. The operations may include conversion from one format to another (e.g., Bayer to YUV), compression, storage in non-volatile memory 150, etc. In addition, image processor 130 forwards pixel values (either processed or unprocessed/raw) received for display on display module 140, thereby enabling a user to view the scene presently captured by camera 100. Image processor 130 may accept user inputs received from input interface 160 on path 163. User inputs include 'clicks' to capture an image frame, another input to record the captured image on non-volatile memory 150, digital zoom to zoom-in/zoom-out of a currently displayed image, etc.

In particular, image processor 130 may represent a same image frame in several formats. For example, image processor 130 may convert an image frame received in Bayer format from image sensor 120 to YUV format for processing operations. Image processor 130 may then compress image frames in YUV format to JPEG format for storage in non-volatile memory 150. In an embodiment, conversion from Bayer format to YUV format entails formation of the pixel values in RGB format. Image processor 130 retrieves instruction and data from RAM 190 or non-volatile memory 150 for execution, to provide several features in accordance with the present invention.

RAM 190 receives program (instructions) and/or data retrieved from non-volatile memory 150, and required for execution by image processor 130. As a part of processing the image frames, RAM 190 provides the storage space required for storing the pixel values representing image frames. As noted above, the image frame may be represented in several formats, as suited for corresponding processing requirements. Various features of the present invention reduce the memory space requirements while providing the image frame in different formats. The features will be clear in comparison with a prior approach, which is described first below.

2. Prior Approach

FIG. 2A illustrates the manner in which RAM 190 is used to store data representing different formats of a same image frame according to a prior approach. In such a prior approach, separate (non-overlapping) buffers (a portion of a memory, usually contiguous locations) are used for storing data representing different formats of a same image frame. Thus, FIG. 2A is shown containing buffer 210-RAW for storing image frames in 'raw' format (e.g., Bayer format) received from image sensor 120, buffer 210-YUV for storing image frames in YUV format, and buffer 210-JPEG for storing image frames in JPEG format. Buffers 210-RAW, 210-YUV and 210-JPEG are located in non-overlapping locations in RAM 190. Each buffer may store one or more image frames (of a same format). It may be appreciated that the specific types of image formats (Bayer, YUV and JPEG) are noted merely by way of illustration, and other types of formats may also be used instead.

Typically, each of buffers 210-RAW and 210-YUV may be designed to have a size to store two image frames, such that one image frame in raw format is being stored, while a previously stored raw image frame is being converted to YUV format. Buffer 210-JPEG may be designed to store four compressed image frames, since typically writing (the compressed) image frame into non-volatile memory 150 may be much slower than writing of raw pixel data to buffer 210-RAW, or the conversion and storage of YUV pixel data to buffer 210-YUV. The prior approach may have associated drawbacks, some of which are noted briefly next.

The use of separate buffers for storing data representing different formats of a same image frame may result in a requirement for a relatively large memory size for RAM 190, and hence be undesirable at least for reasons of cost. For example, assuming each frame generated by image sensor 120 is represented by 12 Megapixels, total size of RAM 190 required may approximately be 68 Megabytes (MB), with 24 MB for each of buffers 210-RAW and 210-YUV, 8 MB for buffer 210-JPEG (2 MB being a worst case assumption for size of a compressed JPEG image frame), an additional 8 MB for storage of code and other data (required for execution by image processor 130), plus 4 MB of temporary buffer space (e.g., for storage of temporary data generated while format conversions and other operations of image processor 130).

Figure 2B:
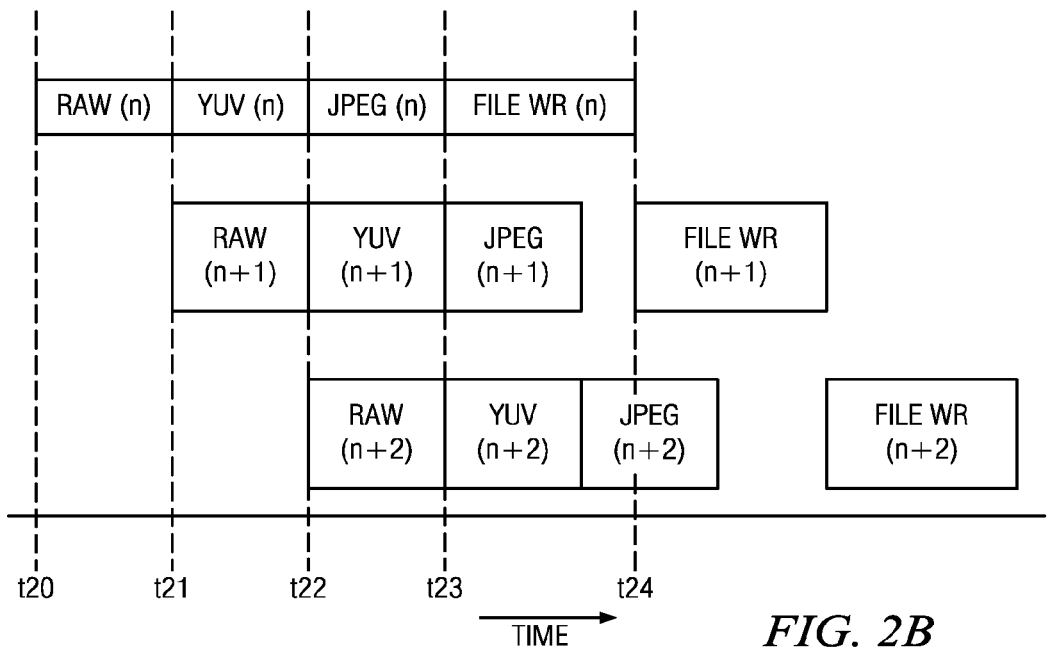
FIG. 2B is a diagram illustrating storage operations with respect to time performed on pixel values of image frames in a prior approach.

Another drawback of the prior approach is that the interval (S2S) between two shots (minimum interval/delay between user-indicated capture instances required to capture images without losing or having to overwrite pixel values already stored) may be unacceptably long and therefore undesirable, as described with respect to FIG. 2B, which illustrates example operations on the RAW, YUV and JPEG buffers. With respect to FIG. 2B, in time interval t20-t21 an image frame (RAW (n)) may be stored in buffer 210-RAW. In time interval t21-t22, RAW (n) is converted to YUV format (YUV (n)) and stored in buffer 210-YUV, while a nextraw image frame (RAW (n+1)) is stored in 210-RAW in locations not overlapping with those in which RAW (n) is stored (i.e., no overwriting occurs).

In time interval t22-t23, YUV (n) is compressed to JPEG format (thus providing JPEG (n)) and stored in buffer 210-JPEG, while RAW (n+1) is converted to YUV (n+1) and stored in a non-overlapping manner in 210-YUV. In the same interval t22-t23 a next raw image frame (RAW (n+2) is stored in 210-RAW. In time interval t23-t24, JPEG (n) is written to non-volatile memory 150. Image frame YUV (n+2), JPEG (n+1) and JPEG (n+2) are generated in a similar manner in corresponding intervals shown in FIG. 2B, and the compressed files JPEG (n+1) and JPEG (n+2) are written to non-volatile memory 150. Thus, it may be noted that the operations may be performed in a concurrent (pipelined) manner, although sequential operations are also possible (though slower than the pipelined approach).

Interval S2S generally depends on the size of (number of image frames that may be stored in) buffers 210-RAW, 210-YUV and 210-JPEG, as well as the time taken to write to non-volatile memory 150. For example, assuming each of buffers 210-RAW and 210-YUV can store two complete image frames (in the corresponding formats respectively), and buffer 210-JPEG can store 'N' JPEG frames (N >2), the S2S interval for corresponding shots are as given below:

$$S2S \text{ for shot } 2 = t(RAW),  \quad \text{Equation 1a}$$

$$S2S \text{ up to shot } N = MAX[(t(RAW), t(YUV), t(JPEG)] \quad \text{Equation 1b}$$

$$S2S \text{ after Shot } N = t(FILE\ WR) \quad \text{Equation 1c}$$

wherein,
  t(RAW) is the time required to store a raw file in buffer 210-RAW,
  t(YUV) is the time required to convert a raw file and write the corresponding YUV file into buffer 210-YUV,
  t(JPEG) is the time required to generate a JPEG file from YUV format, and to store the JPEG file in buffer 210-JPEG, and
  t(FILE WR) is the time required to write a JPEG file in non-volatile memory 150.

Each of times (t(RAW), t(YUV) and t(JPEG)) may approximately be equal. Time t (FILE WR) is typically much longer (e.g., thrice as long) than (any of) t(RAW), t(YUV) and t(JPEG), due to the comparatively lower access speed of non-volatile memory 150 (as compared to RAM 190). Hence, S2S after shot N (as expressed by equation 1c) equals the worst case shot-to-shot 'delay' in the prior scheme, and which is encountered after 'N' successive user commands to capture an image frame. It is assumed that the worst case interval between two user commands to capture an image frame is not greater than any of (t(RAW), t(YUV) and t(JPEG).

To illustrate, it is assumed that a user requires to capture 5 image frames in quick succession (intervals of commands to capture being less than or equal to any of (t(RAW), t(YUV) and t(JPEG)). S2S is not of concern after the command to capture the first frame, since there are two RAW buffers. S2S after the command to capture the second frame equals t(RAW) (equation 1a). S2S after the command to capture the third frame is the maximum of t(RAW), t(YUV), and t(JPEG) and may be assumed to equal any one of the three, since t(RAW), t(YUV), and t(JPEG) are assumed to be approximately equal.

However, S2S after the command to capture frames 3 or 4 equals t(FILE WR) (from Equation 1c). Thus, the worst case S2S is encountered after the third command. In general, it is desirable that the worst case S2S be reached after as many commands to capture as possible, i.e., N should be made as large as possible, without requiring the use of additional buffer space (more memory in RAM 190).

In the prior approach, a worst case JPEG file size (size of JPEG image frame) of 2 MB is assumed, and a memory request for 2 MB space in RAM 190 is made for storage of each JPEG image frame, since typically the size of a JPEG frame is not known until the compression operation is complete. However, the actual size of a JPEG frame may turn out to be much less than 2 MB in some instances, and greater than 2 MB in others. As a result, the prior approach may cause memory fragmentation to occur in buffer 210-JPEG.

In case where JPEG size is greater than 2 MB (buffer size), buffer overflow may occur resulting in special handling of extra data and/or more memory space to accommodate the extra memory required for that JPEG frame.

In a known embodiment, JPEG frames require contiguous locations for storage, i.e., it may not be possible to write a single JPEG frame as separate portions in non-contiguous memory portions. As a consequence, the total number of JPEG frames that can be written in a total available memory space may be limited. Thus, the value of 'N' of equations 1b and 1c above may be small, i.e., since the total number of JPEG files stored in RAM 190 is limited/fewer, the S2S bottleneck t(FILE WR) is encountered sooner (i.e., after a relatively fewer number of user commands to capture an image frame, as illustrated in the example above).

Several features of the present invention address one or more of the drawbacks noted above, as described next in detail.

3. Reducing Memory Requirements

Figure 3:
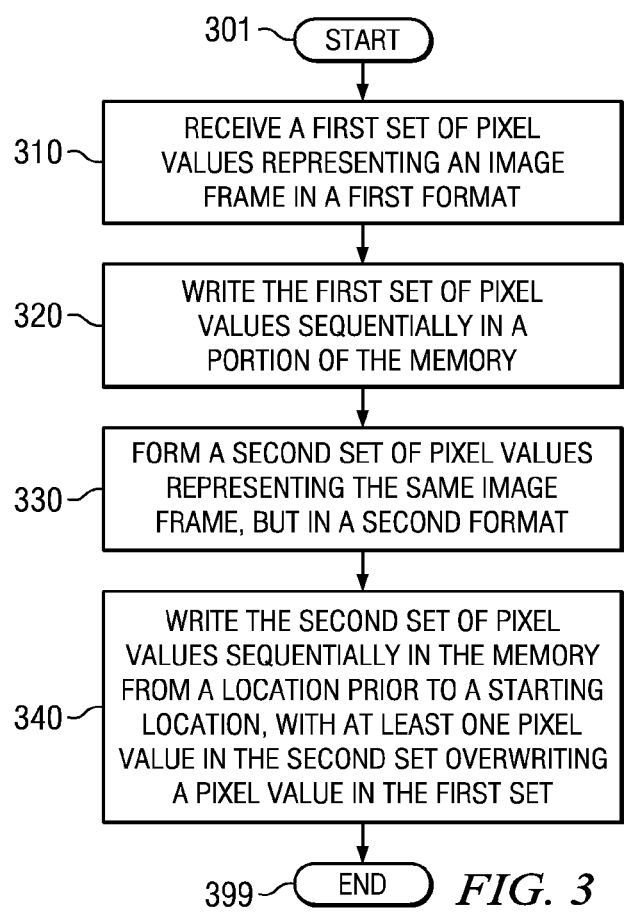
FIG. 3 is a flowchart illustrating the manner in which data representing a same image frame in different formats is stored, in an embodiment of the present invention.

FIG. 3 is a flowchart illustrating the manner in which data representing a same image frame in different formats is stored, in an embodiment of the present invention. The flowchart is described with respect to the device and components of FIGS. 1, and in relation to image processor 130 merely for illustration. However, various features described herein can be implemented in other environments and using other components, as will be apparent to one skilled in the relevant arts by reading the disclosure provided herein.

Furthermore, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 301, in which control passes immediately to step 310.

In step 310, image processor 130 receives a first set of pixel values representing an image frame in a first format. The first format may correspond to raw Bayer data generated by image sensor 120, as well as data of any other formats generated from conversions thereafter. Control then passes to step 320.

In step 320, image processor 130 writes the first set of pixel values sequentially in a portion of a memory beginning from a 'start location' . The start location can be any location of RAM 190, but consistent with a buffering approach (e.g., circular buffer using a specified locations) implemented using RAM 190. Control then passes to step 330.

In step 330, image processor 130 forms a second set of pixel values representing the same image frame, but in a second format. The conversion required for such forming may be according to corresponding formulas, generally well known in the relevant arts.

In the illustrative embodiments described herein, it is assumed that the pixel values in Bayer format are converted to YUV using a dedicated hardware (not shown) contained within image processor 130. The hardware may first convert the pixel values in Bayer format to RGB format and then from RGB format to YUV format. The resulting pixel values in YUV format only are stored in RAM 190. The data in RGB format is not required for any other purpose in the described embodiment and thus not stored in RAM 190. However, alternative embodiments may store the RGB data (and any other formats, as well) also in RAM 190, if required in the corresponding environments of deployment. Control then passes to step 340.

In step 340, image processor 130 writes the second set of pixel values sequentially in the memory beginning from a location prior to the 'start location', with at least one pixel value in the second set overwriting a pixel value in the first set. The term 'prior to' is with respect to an order (e.g., lower addresses to higher addresses or vice versa), such that the second set of pixels can be written when needed, while not overwriting those values of the first set of pixel values needed for conversion.

In an embodiment, image processor 130 writes the second set of pixel values as well as the first set of pixel values in a concurrent fashion (e.g., using multiple execution threads/processes also known as multi-tasking). However, in case of single port memories, the access operations may need to be serialized. Control then passes to step 399, in which the flowchart ends.

Thus, according to an aspect of the present invention, data representing different formats of a same image frame are written in memory such that one substantially overwrites the other. Such overwriting enables reduction of memory space requirements in RAM 190.

However, the approach needs to be controlled to ensure that pixel values are not overwritten before being used for any required image processing operations and conversion. The start location for writing the second set of pixels and/or the conversion rate can be controlled to prevent any such overwrites that are to be avoided.

The techniques described above with respect to the flowchart of FIG. 3 overcome the drawbacks noted above with respect to prior approach. As illustrated next with respect to examples, the techniques enable digital still camera to be implemented with lesser memory, while also reducing the shot-to-shot (S2S) interval.

4. Illustration

Figure 4:
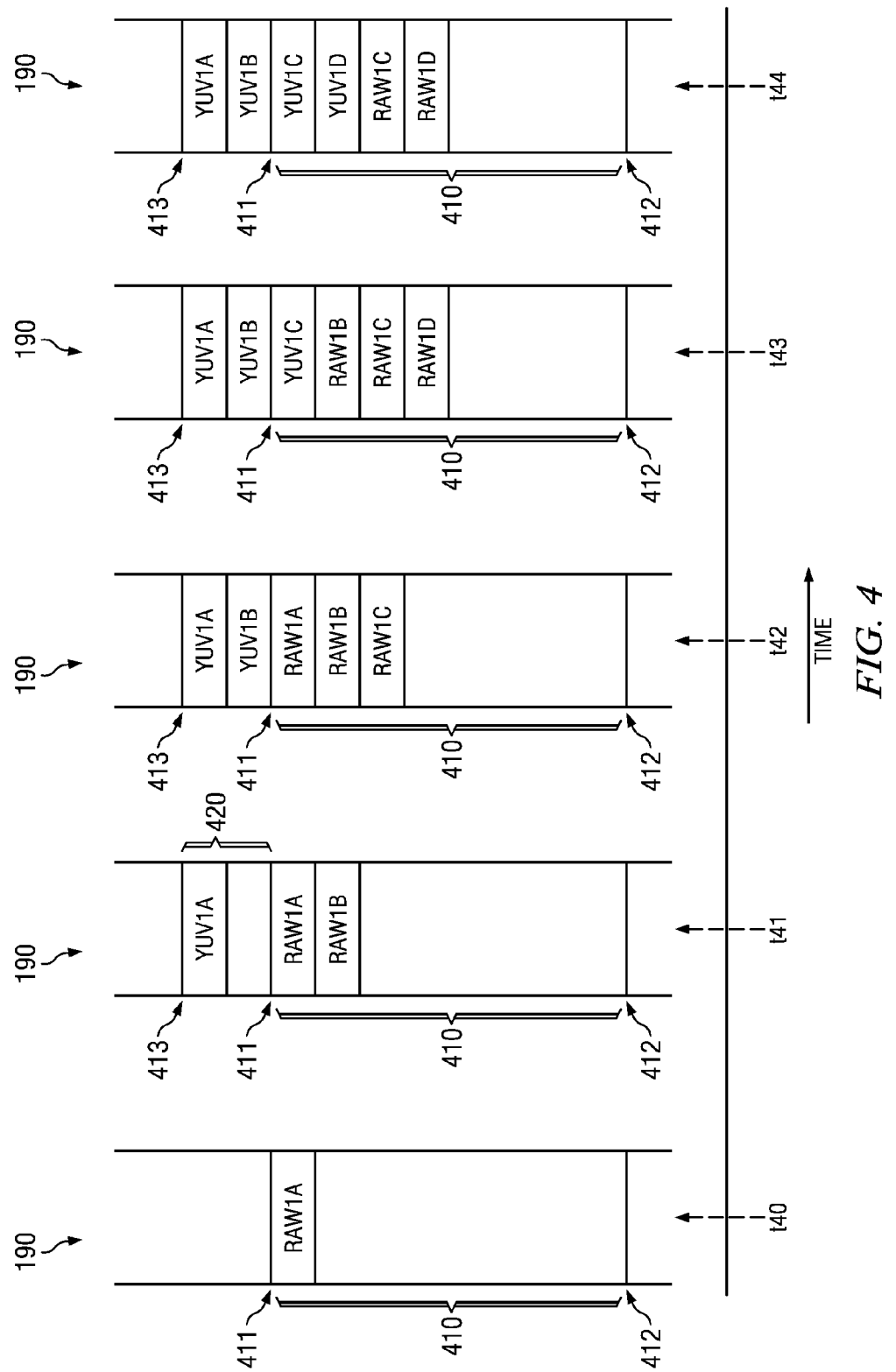
FIG. 4 is a diagram illustrating example contents of a memory at different instances of time, in an embodiment of the present invention.

FIG. 4 is a diagram illustrating the manner in which data representing different formats of a same image frame are written to memory, in an embodiment of the present invention. In FIG. 4, memory portion 410 (which may be pre-allocated for storage of a raw image frame) in RAM 190 is used to (and has a size equal to) store a single raw (e.g., Bayer) image frame. A YUV image frame obtained by converting the raw image frame is also stored substantially in memory portion 410, as depicted by the contents of RAM 190 shown for progressively increasing time instances (t40 through t44).

Markers 411 and 412 respectively denote the start location and end location of memory portion 410 used for storing one (raw) image frame. The following RAW image frame may be stored non-overlapping with memory portion 410 (e.g., following marker 412 after leaving sufficient space for gap 420, described below, of such next frame). It is noted that the conversion from raw format to YUV format may be performed by corresponding hardware units (not shown in any of the Figures) within image processor 130.

At time instance t40, a portion RAW1A of a raw image frame (RAW1) is stored in memory portion 410. RAW1A may represent one or more rows of the raw image frame RAW1. At a later time instance t41, RAW1A is converted to YUV format and stored as YUV1A starting at a memory location 413 above start location 411 of memory portion 410. A next portion RAW1B of raw image frame RAW1 is also stored contiguous to RAW1A.

At a later time instance t42, RAW1B is converted to YUV format and stored as YUV1B, which is stored contiguous to YUV1A, while a next portion RAW1C of raw image frame RAW1 is stored contiguous to RAW1B. At a later time instance t43, RAW1C is converted to YUV format and stored as YUV1C, which is stored contiguous to YUV1A and overwritten on the memory space which earlier (at time instance t42) contained RAW1A. Overwriting refers to writing new data (e.g., YUV1C) in memory locations containing valid data, thereby erasing the previously stored contents (e.g., RAW1A). A next portion RAW1D of raw image frame RAW1 is stored contiguous to RAW1C.

At a later time instance t44, RAW1D is converted to YUV format and stored as YUV1D, which is stored contiguous to YUV1A, and overwritten on the memory space which earlier (t43) contained RAW1B. A next portion RAW1E of raw image frame RAW1 may also be stored contiguous to RAW1D, although not shown in the Figure. Later portions of the raw image frame are stored by overwriting corresponding YUV portions in a similar manner.

Image processor 130, thus, continues to overwrite freshly generated YUV portions image frame RAW1 in memory areas that previously contained earlier portions of the raw image frame. However, image processor 130 stores a YUV pixel value portion without overwriting a corresponding raw pixel value portion from which the YUV pixel value portion where obtained. To illustrate, YUV portion YUV1A is not overwritten in the memory area storing the corresponding raw portion RAW1A, but is rather stored a few memory locations (denoted by gap 420) above the location storing RAW1A. Such a technique ensures that the concurrent storage of the raw and the YUV pixel portions does not cause a YUV portion to overwrite a raw portion before the raw portion has been converted to YUV.

Each of the raw image frame portions RAW1A, RAW2A, etc., can be of any size (e.g., one byte or several bytes), though, in an embodiment, each portion RAW1A, etc., covers a few rows (e.g., 5) of the image being processed. In general, the size (e.g., in terms of number of bytes of memory locations) of 'gap' 420 between start location 411 of memory portion 410 and the start location 413 at which the YUV image frame commences generally depends on the speed (rate) at which pixel values of the raw image frame is written to RAM 190 (referred to for convenience as task 1), and the speed at which pixel values in raw format are converted to YUV format and written to RAM 190 (referred to as task 2), the minimum number of bytes of a raw image frame that are needed to perform the conversion to YUV format, etc.

Assuming that each of the two tasks (task 1 and task 2) are performed at substantially the same speed, then the 'gap' 420 need in theory be only one byte. In practical implementations, the specific size (in terms of number of memory bytes) of gap 420 may be greater than one pixel (which may be represented, for example, by two bytes). In an embodiment, gap 420 equals a number of memory locations required to store pixel values of five rows of the RAW image frame.

In general, however, gap 420 may be determined a priori based, for example, on implementation-specific details such as the operating speeds of specific portions of image processor 130 performing each of tasks 1 and 2, the corresponding interfaces to RAM 190, the nature of the two corresponding image frame formats, the minimum number of bytes of a raw image frame that are needed to perform the conversion to YUV format in a computationally efficiently manner, etc.

Thus, while a raw image frame is being written in memory portion 410, the corresponding image frame in YUV format is also written substantially in the same memory portion 410. Other image frames (raw as well as the corresponding YUV frames) may be stored similarly in substantially overlapping memory portions. As a result, the need for a separate, non-overlapping buffers (or memory portions) for the two different formats of a same image frame is obviated, in contrast to such a need in the prior approach of FIG. 2A. Hence, the memory requirements for storage of the image frame (in different formats) are substantially reduced (for example, buffer 210-YUV of the prior approach of FIG. 2A need not be separately provided), thereby providing corresponding benefits.

It is noted that operations such as auto-white balance, color filter array (CFA) interpolation, color processing, etc., may be performed on the raw image frame, by hardware portions within image processor 130 by retrieving the pixel values of the raw image frame before the raw image frame is completely overwritten by the corresponding YUV frame. In general, as noted above, until completion of usage of the raw pixel data for any/all required image processing operations, the data needs to be preserved (without being overwritten).

Image processing operations such as edge enhancement, brightness and contrast adjustments, noise filtering, efficient compression to JPEG format, etc., may be performed on the corresponding YUV frame. All of the image processing operations noted above modify the properties (content represented by or pixel values in) the respective image frames, and are distinguished from routine operations such as storing, transmitting, etc., which do not modify or transform the content or pixel values of the image frame.

It may be appreciated that the approach described above obviates the need for a separate YUV storage area. Instead, the same portions of memory (plus 'gap' 420) used to store the RAW image frame are used to store the converted image frame in YUV format. As a result, the size of RAM 190 required for storage of the RAW and YUV frames may be reduced.

In an alternative embodiment, the approach described above is implemented for overwriting JPEG frames obtained by compressing YUV image frames as well, as illustrated with respect to FIG. 5. Merely for ease of representation and understanding, the information in FIG. 5 is shown separately from that in FIG. 4. However, for reduced memory space requirements, etc., the corresponding YUV portions of FIG. 4 would be the same as corresponding ones in FIG. 5. For example, YUV1A through YUV1D may respectively correspond to YUV5A through YUV5D, and the two conversions of the respective Figures may happen using substantially overlapping memory spaces in RAM 190.

In FIG. 5, memory portion 510 (which may be pre-allocated for storage of a YUV image frame) in RAM 190 is used to (and has a size equal to) store a single YUV image frame. A JPEG image frame obtained by compressing the YUV image frame is also stored substantially in memory portion 510, as depicted by the contents of RAM 190 shown for progressively increasing time instances. Markers 511 and 512 respectively denote the start location and end location of memory portion 510. It is noted that the conversion from YUV format to JPEG format may be performed by corresponding hardware units (not shown in any of the Figures) within image processor 130.

At time instance t50, a portion YUV5A of a YUV image frame (YUV5) is stored in memory portion 510. YUV5A may represent one or more rows of YUV image frame YUV5. At time instance t51, portion YUV5A is converted (compressed) to JPEG format and stored as JPEG5A starting at a memory location 513 above start location 511 of memory portion 510. A next portion YUV5B of YUV image frame YUV5 is also stored contiguous to YUV5A.

At time instance t52, YUV5B is converted to JPEG format and stored as JPEG5B, which is stored contiguous to JPEG5A, while a next portion YUV5C of frame YUV5 is stored contiguous to YUV5B. At time instance t53, YUV5C is converted to JPEG format and stored as JPEG5C, which is stored contiguous to JPEGS5 and overwritten on the memory space which earlier (time instance t52) contained YUV5A. A next portion YUV5D of image frame YUV5 is stored contiguous to YUV5C.

At time instance t54, YUV5D is converted to JPEG format and stored as JPEG5D, which is stored contiguous to JPEG5C, and overwritten on the memory space which earlier (t53) contained YUV5B. A next portion YUV5E of YUV image frame YUV5 may also be stored contiguous to YUV5D, although not shown in the Figure. Later compressed portions are stored overwriting corresponding YUV portions in a similar manner. The compression of (portions of) YUV5 is continued till the entire frame is compressed and stored. In an embodiment, each portion (YUV5A, YUV5B, YUV5C, etc) of the YUV image frame represents a corresponding 'block' of 16 rows of the raw image frame, each being used to generate a corresponding compressed JPEG portion (JPEG5A, JPEG5B, JPEG5C, etc.). The complete JPEG image frame is then transferred to non-volatile memory 150 using direct memory access (DMA) techniques.

It may be appreciated that the approach described above obviates the need for a separate JPEG storage area. Instead, the same portions of memory (plus 'gap' 520) used to store the YUV data are used to store the corresponding compressed JPEG portions. As a result, the size of RAM 190 may be reduced. Further, The JPEG format being a compressed format, the storage space for a JPEG frame is always less than the storage space required for the corresponding YUV frame, and hence memory space larger than that designed to accommodate the YUV frame is not required for storing the corresponding JPEG file. The techniques of above also reduce the S2S interval, as described next.

5. Reduction of S2S Interval as an Additional Benefit

From the description above, it may be noted that a JPEG image frame is substantially overwritten over the corresponding YUV image frame. Since, substantially the same memory portions (as used for a YUV image frame) are reused to store the corresponding JPEG frame, no worst case assumption of the required storage area for a JPEG file may need to be made. Instead, once the complete JPEG image frame is written (over the corresponding YUV frame), the total size of the JPEG frame is known.

As a result, the memory fragmentation such as would occur in 210-JPEG (of FIG. 2A in the prior approach due to allocation of separate buffer for storing JPEG frame) may not occur in the technique of FIGS. 3 and 5, and no delay for allocation of memory is incurred as was the case in the prior approach. As a consequence, more JPEG frames (greater value of 'N' of equations 1b and 1c) can be stored in RAM 190 (without incurring a corresponding increase in the size of RAM 190). As an illustration, assuming the total memory available for storing JPEG frames in memory is 8 MB, using the prior approach (which assumes a worst case JPEG size of 2 MB), four JPEG frames can be stored in the available 8 MB of memory. However, on an average (say 9 out of 10 times), the size of a JPEG frame is usually only about 1 MB. Hence, as a comparison, using an aspect of the present invention eight JPEG frames can be stored in the available 8 MB of memory.

Typically, it is desirable to capture about four to eight image frames without the user of a camera perceiving a delay (to capture the next image frame). It may be appreciated that using the approaches of the present invention, the worst-case bottleneck of [S2S=t(FILE WR)] occurs after a much larger number of user commands to capture an image frame, thereby reducing a potential degradation in (a user perception of) S2S interval.

It is noted that, typically a user may not need to capture more than a few (e.g., about ten frames) in quick succession (in case of still cameras). Hence, a reasonable increase in the number of JPEG files that can be stored in RAM 190 provides for the S2S bottleneck being reached only after a larger number of user commands to capture image frames, thereby improving usability. Thus, in addition to reduced memory requirements, the techniques described above also provide the benefit of reduction in the S2S interval, at least for a reasonable number (four to eight, as noted above) of successive user commands to capture.

The techniques noted above with respect to FIGS. 3 and 4 may, however, require modification when a user command to store a 'zoomed in' form of an image frame is given, as described next with respect to FIGS. 6 and 7.

6. Supporting Digital Zoom

As is well known in the relevant arts, "digital zoom" refers to providing a magnified image of a scene, without using lens action. Thus, digital zoom entails processing of the pixel data to provide a larger size image, and may thus be viewed as an image processing operation. Operations such as interpolation and replication are generally used for generating a magnified image, which is then displayed to provide the digital zoom feature.

In the embodiment described below, it is assumed that a user presses a 'zoom button' to request capture of a digitally zoomed image and in response, the central portion 610 of an image frame 600 (shown in FIG. 6) is to be magnified, and shown as occupying the (same) entire area that would be covered by frame 600.

In response to a digital zoom command (which may be provided simultaneously with a command to capture a frame), image processor 130 selects raw pixel values representing centre portion 610 of image frame 600, and stores the raw pixel values (RAW-ZOOM) in region 740 of RAM 190, as shown in FIG. 7. In FIG. 7, which illustrates portions of contents of RAM 190 at example time instances t70, t71 and t72, markers 711 and 712 respectively denote the start location and end locations of memory portion 720 allocated for the storage of a complete raw image frame (as would have been stored had a digital zoom command not been given). Marker 713 denotes the start location of RAW-ZOOM, and marker 712 also denotes the end location of RAW-ZOOM. Thus, in the embodiment, image processor 130 stores the raw pixel values of portion 610 at the bottom of memory portion 720.

To describe the operations illustrated in FIG. 7, at time instance t70, values (RAW-ZOOMA) of raw pixels of a row (e.g., first row) of image portion 610 are stored in memory portion 740, starting from start location denoted by marker 713. At a later time instance t71, raw pixel values RAW-ZOOMA are converted to YUV format, and duplicated a number of times required by the degree of zoom requested. In the example of FIG. 7, it is assumed that a zoom of four (4×) is requested, and each row of pixel values converted to YUV format (YUV-ZOOMA) is shown replicated four times, and stored in RAM 190 starting from a location indicated by marker 715. A second row of raw pixel values RAW-ZOOMB is also received and stored in memory portion 740.

For other degrees of zoom, each row would be duplicated by a corresponding number of times. Based on the specific degree of zoom requested, image processor 130 duplicates each row of pixels in portion 610 (and retrieved from memory portion 740), and stores the pixel values of the zoomed (expanded/magnified) portion 610 in RAM 190 starting from a memory location (indicated by marker 715) above the start location 711 of memory portion 720. In an embodiment, gap 730 corresponds to pixel values of 180 rows of image portion 610. It may be appreciated that gap 730 has to be larger than gap 420 of FIG. 4 due to the replication of the converted rows in YUV format.

Image processor 130 continues to store raw pixel values of rows of image portion 610 in memory portion 740, as well as the corresponding replicated rows of YUV pixel values. As the storing operation progresses, image processor 130 may overwrite one or more of the raw pixel values in portion 740 with YUV pixel values obtained by converting some of the raw pixel values. Thus, contents of RAM 190 at a later time instance t72, shows rows RAW-ZOOMA and RAW-ZOOMB overwritten by YUV-ZOOMN (which corresponds to pixel values RAW-ZOOMN of the last row of image portion 610).

It is noted that the storing of raw pixel values in the bottom portion (740) of memory portion 720 is performed to prevent inadvertent overwriting of raw pixel values before they are converted to YUV format. In general, when zoom command is active, a row of pixels in YUV format (e.g., YUV-ZOOMA) would be X-times as large (X times as many pixel values due to replication) as the corresponding raw pixel value portion (e.g., RAW-ZOOMA), X being the zoom factor as noted above. It may be appreciated that an expanded YUV portion may overwrite a RAW portion that has not yet been converted to YUV. For example, if the technique of FIG. 4 had been followed when a zoom command is given, YUV1A (which might have to be replicated X times) may be large enough that a raw pixel value portion (e.g., RAW1B) is overwritten and erased, before RAW1B is converted to the corresponding YUV1B.

Thus, according to an aspect of the present invention, when a zoom command is given, the raw pixel values of a centre portion (e.g., similar to portion 610 of FIG. 6) of the captured image frame are stored at the bottommost portion of the allocated memory area. Further, the gap (e.g., 730 in FIG. 7) between the start location of the allocated memory area for the raw pixel values and the start location for storing the converted YUV pixel values may be much larger than in the approach of FIGS. 4 and 5, to prevent inadvertent overwriting of raw pixel values before they have been converted to YUV.

It may be appreciated that the digital camera in accordance with FIG. 7 is designed under the assumption that only the pixels in area 610 need to be converted (for further use) when a viewer presses a 'zoom button'. Accordingly, the approach of above is described with respect to conversion of only the pixels of area 610. However, alternative embodiments can be implemented to convert all the pixels, when such pixel are required for further processing.

Thus, techniques according to the present invention enable the storage of zoomed image frames as well, while reducing memory required for storage.

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method for processing image frames in a digital still camera, said method comprising:
    receiving a first plurality of pixel values representing an image frame in a first format;
    storing said first plurality of pixel values in a memory;
    forming a second plurality of pixel values representing said image frame in a second format by processing said first plurality of pixel values;
    overwriting at least a part of said first plurality of pixel values in storing said second plurality of pixel values; and
    performing a first image processing operation on said first plurality of pixel values representing all of said image frame and a second image processing operation on said second plurality of pixel values; and
    storing said second plurality of pixel values starting from a start location which is earlier than a first location in said memory from which said first plurality of pixel values are stored,
    wherein said start location is chosen such that any required ones of the first plurality of pixel values for said first image processing operation is available at time instances of said performing when those pixel values would be required,
    wherein said storing comprises said overwriting.

2. The method of claim 1, wherein said first format and said second format respectively comprise Bayer format and YUV format.

3. The method of claim 2, wherein said first image processing operation comprises one of auto-white balance, color filter array (CFA) interpolation, and color processing, wherein said second image processing operation comprises one of edge enhancement, brightness and contrast adjustments, and noise filtering.

4. The method of claim 1, wherein said first format and said second format respectively comprise YUV format and JPEG format,
    wherein said first image processing operation comprises edge enhancement, brightness and contrast adjustments, and noise filtering.

5. The method of claim 1, wherein said forming comprises:
    dividing said image frame into a plurality of portions, wherein a first subset of pixel values representing each portion in said first format are processed to generate a second subset of pixel values representing the same portion in said second format, wherein said first subset of pixel values and said second subset of pixel values are comprised in said first plurality of pixel values and said second plurality of pixel values respectively,
    wherein said storing stores said second subset of pixel values without overwriting said first subset of pixel values for the same portion.

6. The method of claim 1, further comprising:
    receiving a command to provide a digital zoom of said image frame,
    wherein said second image processing operation comprises forming a magnified image corresponding to a portion of said image frame in response to receiving said command such that said second plurality of pixel values represent said magnified image,
    wherein said first plurality of pixel values represent said portion,
    wherein said start location is chosen to ensure that at least some of said second plurality of pixel values would overwrite some of said first plurality of pixel values, and any required one of said first plurality of pixel values for forming any of said second plurality of pixel values is available when required for said forming of said magnified image.

7. The method of claim 6, wherein said forming of said magnified image comprises replicating each pixel value in said first plurality of pixel values related to said portion a number of times equaling a zoom factor specified by said viewer.

8. A non-transitory computer readable medium storing one or more sequences of instructions for enabling a digital still camera to process image frames, wherein execution of said one or more sequences of instructions by one or more processors contained in said system causes said system to perform the actions of:
    receiving a first plurality of pixel values representing an image frame in a first format;
    storing said first plurality of pixel values in a memory;
    forming a second plurality of pixel values representing said image frame in a second format by processing said first plurality of pixel values;
    overwriting at least a part of said first plurality of pixel values in storing said second plurality of pixel values; and
    performing a first image processing operation on said first plurality of pixel values representing all of said image frame and a second image processing operation on said second plurality of pixel values; and
    storing said second plurality of pixel values starting from a start location which is earlier than a first location in said memory from which said first plurality of pixel values are stored,
    wherein said start location is chosen such that any required ones of the first plurality of pixel values for said first image processing operation is available at time instances of said performing when those pixel values would be required,
    wherein said storing comprises said overwriting.

9. The machine readable medium of claim 8, wherein said first format and said second format respectively comprise Bayer format and YUV format.

10. The machine readable medium of claim 9, wherein said first image processing operation comprises one of auto-white balance, color filter array (CFA) interpolation, and color processing, wherein said second image processing operation comprises one of edge enhancement, brightness and contrast adjustments, and noise filtering.

11. The machine readable medium of claim 9, wherein said first format and said second format respectively comprise YUV format and JPEG format,
  wherein said first image processing operation comprises edge enhancement, brightness and contrast adjustments, and noise filtering.

12. The machine readable medium of claim 9, wherein said forming comprises:
  dividing said image frame into a plurality of portions, wherein a first subset of pixel values representing each portion in said first format are processed to generate a second subset of pixel values representing the same portion in said second format, wherein said first subset of pixel values and said second subset of pixel values are comprised in said first plurality of pixel values and said second plurality of pixel values respectively,
  wherein said storing stores said second subset of pixel values without overwriting said first subset of pixel values for the same portion.

13. The machine readable medium of claim 8, further comprising:
  receiving a command to provide a digital zoom of said image frame,
  wherein said second image processing operation comprises forming a magnified image corresponding to a portion of said image frame in response to receiving said command such that said second plurality of pixel values represent said magnified image,
  wherein said first plurality of pixel values represent said portion,
  wherein said start location is chosen to ensure that at least some of said second plurality of pixel values would overwrite some of said first plurality of pixel values, and any required one of said first plurality of pixel values for forming any of said second plurality of pixel values is available when required for said forming of said magnified image.

14. The machine readable medium of claim 13, wherein said forming of said magnified image comprises replicating each pixel value in said first plurality of pixel values related to said portion a number of times equaling a zoom factor specified by said viewer.

15. A digital still camera for processing image frames, said digital still camera comprising:
  a processor and a memory, wherein said processor is operable to:
  receive a first plurality of pixel values representing an image frame in a first format;
  store said first plurality of pixel values in said memory;
  form a second plurality of pixel values representing said image frame in a second format by processing said first plurality of pixel values;
  overwrite at least a part of said first plurality of pixel values in storing said second plurality of pixel values; and
  perform a first image processing operation on said first plurality of pixel values representing all of said image frame and a second image processing operation on said second plurality of pixel values; and
  store said second plurality of pixel values starting from a start location which is earlier than a first location in said memory from which said first plurality of pixel values are stored,
  wherein said start location is chosen such that any required ones of the first plurality of pixel values for said first image processing operation is available at time instances of said performing when those pixel values would be required,
  wherein said store comprises said overwrite.

16. The digital still camera of claim 15, wherein said first format and said second format respectively comprise Bayer format and YUV format.

17. The digital still camera of claim 15, wherein said processor is further operable to receive a command to provide a digital zoom of said image frame,
  wherein said second image processing operation comprises forming a magnified image corresponding to a portion of said image frame in response to receiving said command such that said second plurality of pixel values represent said magnified image,
  wherein said start location is chosen to ensure that at least some of said second plurality of pixel values would overwrite some of said first plurality of pixel values, and any required one of said first plurality of pixel values for forming any of said second plurality of pixel values is available when required for said forming of said magnified image.

* * * * *